(12) United States Patent
Yamada

(10) Patent No.: US 11,387,462 B2
(45) Date of Patent: Jul. 12, 2022

(54) LITHIUM ION BATTERY

(71) Applicant: TOYOTA JIDOSHA KABUSHIKI KAISHA, Toyota (JP)

(72) Inventor: Takanobu Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/832,097

(22) Filed: Mar. 27, 2020

(65) Prior Publication Data

US 2020/0328427 A1 Oct. 15, 2020

(30) Foreign Application Priority Data

Apr. 9, 2019 (JP) .............................. JP2019-074407

(51) Int. Cl.
*H01M 4/66* (2006.01)
*H01M 4/62* (2006.01)
*H01M 10/0525* (2010.01)

(52) U.S. Cl.
CPC ........... *H01M 4/667* (2013.01); *H01M 4/624* (2013.01); *H01M 10/0525* (2013.01)

(58) Field of Classification Search
CPC .. H01M 4/667; H01M 4/624; H01M 10/0525; H01M 10/653; H01M 10/6551; H01M 4/131; H01M 4/136; H01M 10/0587; H01M 2220/20; Y02E 60/10; Y02P 70/50; H01G 11/06; H01G 11/26
USPC ......................................................... 429/232
See application file for complete search history.

(56) References Cited

U.S. PATENT DOCUMENTS

2016/0293936 A1   10/2016  Takebayashi
2016/0336614 A1*  11/2016  Hatta ................ H01M 10/0569

FOREIGN PATENT DOCUMENTS

JP    2015-103332 A    6/2015
JP    2017-143004 A    8/2017

* cited by examiner

*Primary Examiner* — Gary D Harris
(74) *Attorney, Agent, or Firm* — Oliff PLC

(57) ABSTRACT

An object of this disclosure is to provide a lithium ion battery in which generation of heat can be suitably suppressed. Provided is a lithium ion battery including a positive electrode and a negative electrode. The positive electrode includes a positive electrode collector, a positive electrode active material layer, and an insulating layer provided on another part of the surface of the positive electrode collector, so as to be adjacent to the positive electrode active material layer. The insulating layer contains an inorganic filler and a binder. At least part of the surface of the inorganic filler is covered with LPO.

4 Claims, 4 Drawing Sheets

LITHIUM ION BATTERY

CROSS REFERENCE TO RELATED APPLICATION

The present application claims priority based on Japanese Patent Application No. 2019-074407, filed on Apr. 9, 2019, the entire contents whereof are incorporated in the present specification by reference.

BACKGROUND OF THE DISCLOSURE

1. Field

The art disclosed herein relates to a lithium ion battery.

2. Background

Lithium ion batteries are lightweight and afford high energy densities, and therefore have come to be preferably used for instance as portable power sources, and as high-output power sources installed in vehicles. Such lithium ion batteries are provided with a spiral electrode body in which a power storage element, having a configuration where a positive electrode and a negative electrode are insulated by a separator or the like, is stacked and wound, to yield a cylindrical shape or an elliptical cylindrical shape, within one battery case. The batteries are configured as a result so that a large amount of power per one charge/discharge can be extracted from the positive electrode and the negative electrode having a large surface area.

However, for instance secondary batteries for high-output applications where the battery is charged and discharged at a high rate are characteristically prone to generate heat also during ordinary use (during charge and discharge). In particular, an uncoated section of a positive electrode collector in which a positive electrode active material layer is not provided constitutes a collecting section in which current density is high and that becomes readily oxidized, as a result of which the uncoated section is prone to generating heat. Generation of heat by lithium ion batteries is an issue to be improved upon in order to increase safety at the time of use of the battery.

It is an object of the art disclosed herein, arrived at in the light of the above considerations, to provide a lithium ion battery in which generation of heat can be suitably suppressed.

SUMMARY

As a solution to the above problem, the art disclosed herein provides a lithium ion battery having a positive electrode, a negative electrode, and a nonaqueous electrolyte. In this lithium ion battery, the positive electrode has a positive electrode collector, a positive electrode active material layer provided on part of the surface of the positive electrode collector, and an insulating layer provided on another part of the surface of the positive electrode collector, so as to be adjacent to the positive electrode active material layer. Said insulating layer contains an inorganic filler and trilithium phosphate ($Li_3PO_4$; hereafter also referred to simply as "LPO"), and a binder, such that at least part of the surface of the inorganic filler is covered with LPO.

It is known that acids are generated as a result of oxidative decomposition of electrolyte solutions when the potential of the positive electrode is high. In a case where the positive electrode active material layer contains LPO, as illustrated in Japanese Patent Application Publication No. 2015-103332, LPO undergoes an acid-base reaction with such an acid, and the resulting phosphate ions ($PO_4^{3-}$) leach out. The phosphate ions have the function of enhancing for instance the overcharge resistance of the battery by reaching the negative electrode and forming a coating film that suitably suppresses exothermic reactions in the negative electrode, to suppress generation of heat by the battery. Studies by the inventors have revealed that exothermic reactions in the negative electrode can be effectively suppressed by an LPO-derived coating film that becomes formed, on the negative electrode, through arrangement of LPO by providing an insulating layer on an uncoated section of the positive electrode that is readily brought to a high-potential state as a result of current concentration. The inventors found that this heat generation suppression effect can be brought out yet more effectively by controlling the manner in which LPO is formulated. The art disclosed herein was perfected on the basis of such findings.

In a preferred implementation of the lithium ion battery according to the present art, a ratio of the thickness of LPO that covers the inorganic filler with respect to the average particle size of the inorganic filler lies in the range of 0.1 to 1.2. Such a configuration is preferable since it allows balancing the heat generation suppression effect derived from LPO with suppression of increases in resistance through addition LPO to the insulating layer.

In a preferred implementation of the lithium ion battery according to the present art, the average thickness of the insulating layer is 10 µm or less. The lithium ion battery may be embodied so that the bulk and amount of the insulating layer provided on the positive electrode collector are small, from the viewpoint of reducing weight and costs. By incorporating LPO in an insulating layer in a form where the inorganic filler is coated with LPO, it becomes possible to elicit a predetermined heat generation suppression effect using a yet smaller amount of LPO, and to reduce the thickness (i.e. bulk and amount) of the insulating layer. As a result a lithium ion battery is provided which is safe and in which reductions in both weight and cost are achieved.

In the present art, the term "average thickness" is an arithmetic mean value obtained by measuring, at 3 or more points, the thickness (dimension in a direction substantially perpendicular to the surface of a base material) of a target site, in a cross-sectional observation of the target site, using for instance an electron microscope. For instance, the average thickness of the "insulating layer" is a dimension of the insulating layer in a direction perpendicular to the surface of the positive electrode collector.

In a preferred implementation of the lithium ion battery according to the present art, the inorganic filler is at least one selected from the group consisting of a boehmite powder, a zeolite powder, and an alumina powder. More preferably, the inorganic filler is a boehmite powder. An insulating layer of superior heat resistance can be produced conveniently through the use of such a powder as the inorganic filler. The use of a boehmite powder having a lower Mohs hardness than that of alumina allows suppressing generation of metallic foreign matter arising for instance from scraping of equipment contact sections by portions of inorganic filler not covered with LPO, during the production process.

The lithium ion battery is thus provided as a battery that is highly safe and in which short circuits between a positive electrode collector (uncoated section) and a negative electrode active material layer are suppressed, even in a case where for instance metal foreign matter is mixed in the battery. Such safety in cases where the battery temperature rises due to overcharge or the like can be suitably applied to for instance secondary batteries having a multilayer structure (including multilayer electrode bodies and wound electrode bodies) in which multiple power storage elements are stacked, in applications where the temperature of the lithium ion battery itself is prone to rise on account of repeated charging and discharge with large currents at a high rate. In addition, the above high safety can be suitably exploited in secondary batteries that are used in close proximity to a person, in applications where high safety is demanded. Therefore, the lithium ion battery disclosed herein can be suitably used as a drive power source in vehicles (main power source); among the foregoing, the lithium ion battery disclosed herein can be suitably used as a drive power source in plug-in hybrid vehicles or the like.

The above and other elements, features, steps, characteristics and advantages of the present invention will become more apparent from the following detailed description of the embodiments with reference to the attached drawings.

DETAILED DESCRIPTION

Figure 1:
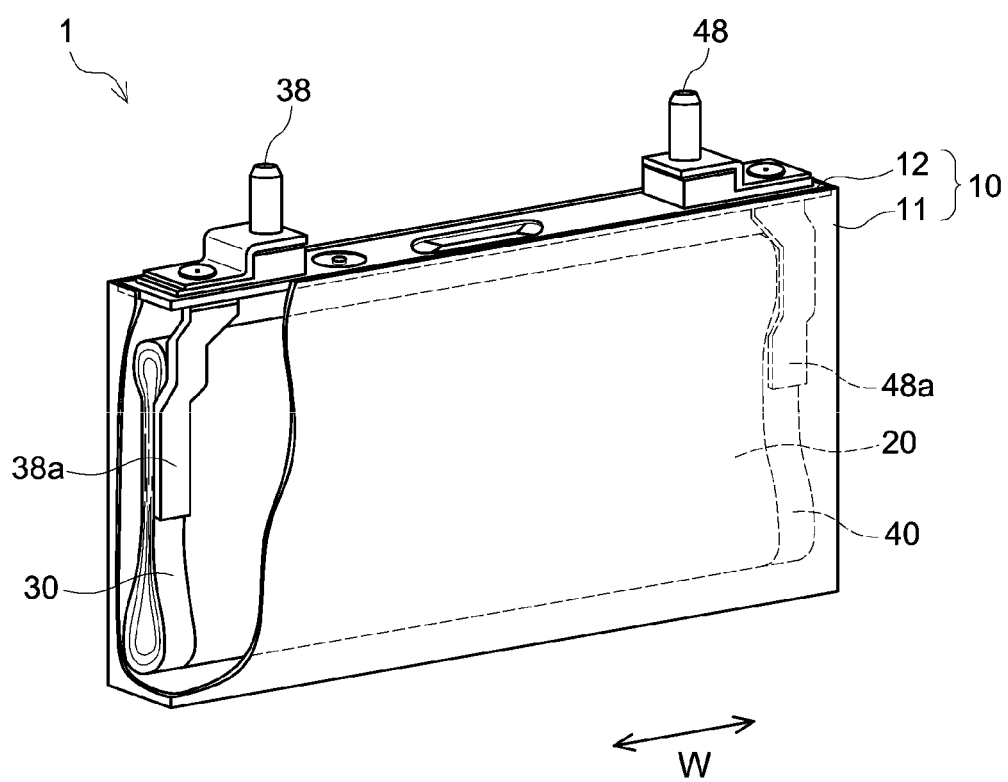
FIG. 1 is a cutaway perspective-view diagram illustrating schematically the configuration of a lithium ion battery according to an embodiment.

An embodiment of the lithium ion battery disclosed herein will be explained below. Any features other than the matter specifically set forth in the present specification (for instance the configuration of an insulating layer) and that may be necessary for carrying out the present invention (for instance structures and production processes of lithium ion batteries not being characterizing features of the present art) can be regarded as design matter for a person skilled in the art based on conventional art in the field in question. The present art can be realized on the basis of the disclosure of the present specification and common technical knowledge in the relevant field. The dimensional relationships (length, width, thickness and so forth) in the drawings illustrated below do not necessarily reflect actual dimensional relationships. In the present specification, a numerical value range notated as "A to B" denotes "equal to or larger than A and equal to or smaller than B", and includes "for instance smaller than A" and "for instance smaller than B".

In the present specification, the term "lithium ion battery" denotes a battery in general that utilizes a lithium ion as a charge carrier, such that the battery can be charged and discharged repeatedly accompanying the movement of charge carriers between the positive and negative electrodes. The electrolyte in the lithium ion battery may be for instance any one from among a nonaqueous electrolyte solution, a gel-like electrolyte, and a solid electrolyte. Such lithium ion batteries encompass generally batteries referred to for instance as lithium ion secondary batteries or lithium secondary batteries, and include also for instance lithium polymer batteries and lithium ion capacitors.

Lithium Ion Battery

Figure 2:
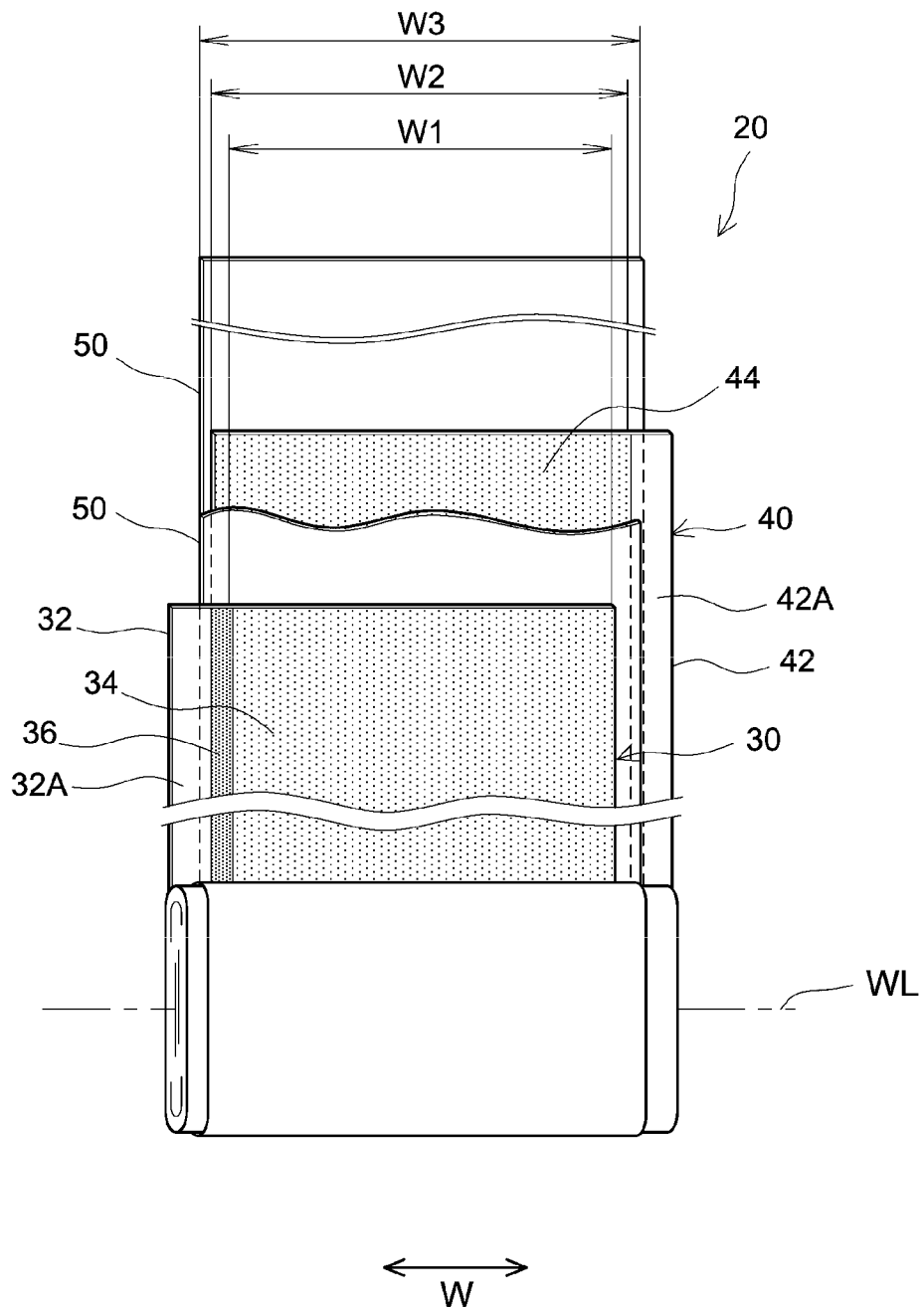
FIG. 2 is a partial development-view diagram for explaining the configuration of a wound electrode body.
Figure 3:
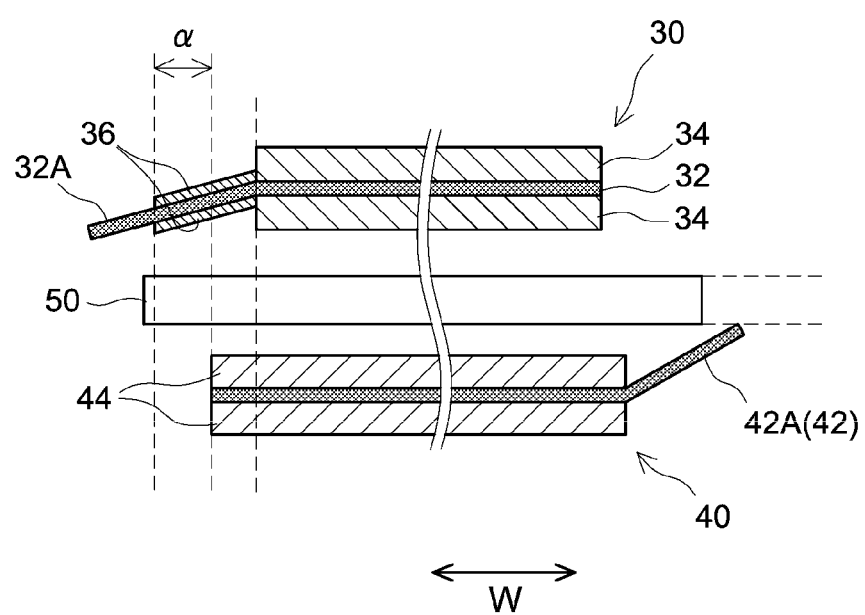
FIG. 3 is a cross-sectional diagram of a wound electrode body according to the present embodiment.

FIG. 1 is a cutaway perspective-view diagram illustrating the configuration of a lithium ion battery 1 according to an embodiment. FIG. 2 is a partial development-view diagram for explaining the configuration of a wound electrode body 20. The lithium ion battery 1 is configured by accommodating a wound electrode body 20 that has a positive electrode 30, a negative electrode 40 and a separator 50, in a battery case 10, together with a nonaqueous electrolyte solution (not shown). The reference symbol W in the figure denotes the width direction of the battery case 10 and of the wound electrode body 20, which is a direction that coincides with a winding axis WL of the wound electrode body 20. As illustrated in FIG. 2, the electrode body 20 is configured by laying up the separator 50, the negative electrode 40, the separator 50 and the positive electrode 30 in this order. FIG. 3 is a cross-sectional diagram of a main section of the electrode body 20.

The positive electrode 30 has a positive electrode collector 32, a positive electrode active material layer 34 and an insulating layer 36.

The positive electrode active material layer 34 is a porous body containing a positive electrode active material, and which can be impregnated with an electrolyte solution. The positive electrode active material releases lithium ions, being charge carriers, into the electrolyte solution, or stores lithium ions from the electrolyte solution. The positive electrode active material layer 34 can contain additionally a conductive material and LPO. The positive electrode active material layer 34 may be provided on part of the surface (one face or both faces) of the positive electrode collector 32. The positive electrode collector 32 is a member for holding the positive electrode active material layer 34, and for supplying and recovering charge to/from the positive electrode active material layer 34. The positive electrode collector 32 is suitably made up of a conductive member containing a metal (for instance aluminum, an aluminum alloy, nickel, titanium, and stainless steel) having good conductivity and that is electrochemically stable in the positive electrode environment within the battery.

In the positive electrode active material layer 34, particles of a granular positive electrode active material are typically bonded to each other, together with a conductive material, and also to the positive electrode collector 32, by means of a binder. Various materials used conventionally as positive electrode active materials in lithium ion batteries can be used herein as the positive electrode active material, without particular limitations. Preferred examples include particles of an oxide (lithium-transition metal oxide) made up of lithium and a transition metal element, such as lithium nickel oxide (for instance $LiNiO_2$), lithium cobalt oxide (for instance $LiCoO_2$) and lithium manganese oxide (for instance $LiMn_2O_4$), as well as composites of the foregoing (for instance $LiNi_{0.5}Mn_{1.5}O_4$ and $LiNi_{1/3}Co_{1/3}Mn_{1/3}O_2$), and also particles of a phosphate salt having lithium and a transition metal element as constituent metal elements, for instance lithium manganese phosphate ($LiMnPO_4$) and lithium iron phosphate ($LiFePO_4$). Such a positive electrode active material layer 34 can be produced for instance by supplying a positive electrode paste resulting from dispersing a positive electrode active material, a conductive material and a binder (for instance an acrylic resin such as a (meth)acrylate polymer, a vinyl halide resin such as polyvinylidene fluoride (PVdF), or a polyalkylene oxide such as polyethylene oxide (PEO)), in an appropriate dispersion medium (for instance N-methyl-2-pyrrolidone), onto the surface of the positive electrode collector 32, followed by removal of the dispersion medium by drying. In a configuration including a conductive material, for instance a carbon material such as carbon black (typically acetylene black or ketjen black), activated carbon, graphite or carbon fibers can be suitably used as the conductive material. The foregoing may be used as any one type singly, or in the form of combinations of two or more types.

The average particle size ($D_{50}$) of the positive electrode active material particles is not particularly limited, and is typically 1 µm or more, preferably 3 µm or more, for instance 5 µm or more, and is typically 15 µm or less, preferably 10 µm or less and for instance 8 µm or less. The proportion of the positive electrode active material in the positive electrode active material layer 34 as a whole can be about 75 mass % or more, typically 80 mass % or more, for instance 85 mass % or more, and may be typically 99 mass % or less, for instance 95 mass % or less. The proportion of the conductive material in the positive electrode active material layer 34 is typically 1 part by mass or more, preferably 3 parts by mass or more, and for instance 5 parts by mass or more, and typically 15 parts by mass or less, preferably 12 parts by mass or less and for instance 10 parts by mass or less, relative to 100 parts by mass of the positive electrode active material. The proportion of the binder in the positive electrode active material layer 34 can be typically set to 0.5 parts by mass or more, preferably 1 part by mass or more and for instance 1.5 parts by mass or more, and typically 10 parts by mass or less, preferably 8 parts by mass or less, and for instance 5 parts by mass or less, relative to 100 parts by mass of the positive electrode active material. The thickness (average thickness; likewise hereafter) of the positive electrode active material layer 34 after pressing can be typically 10 µm or more, for instance 15 µm or more, and can be typically 50 µm or less, or 30 µm or less, for instance 25 µm or less. The density of the positive electrode active material layer 34 is not particularly limited, but can be typically set to 1.5 g/cm³ or higher, for instance 2 g/cm³ or higher, and may be set to 3 g/cm³ or lower, for instance 2.5 g/cm³ or lower.

Unless otherwise specified, the term "average particle size" in the present specification denotes a cumulative 50% particle size ($D_{50}$) in a volume-basis particle size distribution obtained in accordance with a laser diffraction-light scattering method. Herein $D_{10}$ denotes a particle size corresponding to a cumulative 10%, $D_{90}$ denotes a particle size corresponding to a cumulative 90%, and $D_{max}$ denotes a mode diameter, from the small particle size side, in the above particle size distribution.

Studies by the inventors have thus far revealed that in a configuration in which the positive electrode active material layer 34 contains LPO, as described above, this LPO forms a coating film that suitably suppresses exothermic reactions in the negative electrode, and as a result the overcharge resistance of the lithium ion battery can be suitably enhanced. A preferred configuration can be adopted in which the positive electrode active material layer 34 contains LPO, from the viewpoint of suppressing generation of heat in the lithium ion battery 1. The proportion of LPO in a case where the positive electrode active material layer 34 contains LPO is suitably set to lie in the range from 0.88 to 8.8 parts by mass relative to 100 parts by mass of the positive electrode active material, from the viewpoint of both achieving an effect of enhancing overcharge resistance elicited by LPO, and also increasing the viscosity of the positive electrode paste and productivity at the time of production of the positive electrode. The specific surface area of LPO is suitably set to 0.9 to 20.3 m²/g, from the viewpoint of improving overcharge resistance and reducing reaction resistance. The average particle size of LPO may be preferably 1 µm or more, more preferably 2 µm or more, and for instance 2.5 µm or more, and may be preferably 30 µm or less, more preferably 8 µm or less, and for instance 5 µm or less. The $D_{90}$ of LPO may be preferably 60 µm or less, more preferably 40 µm or less, or 20 µm or less. The $D_{10}$ of LPO may be preferably 0.3 µm or more, more preferably 0.6 µm or more, or 0.8 µm or more. Further, the $D_{max}$ of LPO may be preferably 80 µm or less, more preferably 60 µm or less, or 50 µm or less.

Figure 4A:
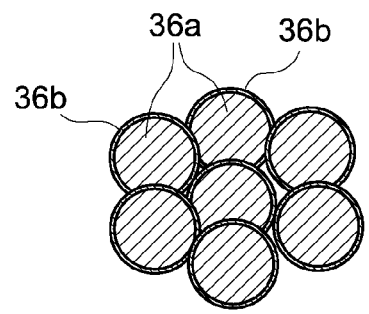
FIGS. 4A and 4B are cross section schematic diagrams for explaining the arrangement of LPO on an inorganic filler that makes up an insulating layer.

The insulating layer 36 contains an inorganic filler, LPO and a binder, and has electrical insulating properties. As illustrated in FIG. 4A, the insulating layer 36 contains LPO 36b, so as to cover at least part of the surface of the inorganic filler 36a. The insulating layer 36 is typically formed through binding of the inorganic filler 36a coated with LPO 36b (hereafter also referred to as "LPO-coated inorganic filler") by means of a binder. The insulating layer 36 may be a porous layer that allows charge carriers to pass therethrough. As illustrated in FIGS. 2 and 3, the insulating layer 36 is provided in a region which is part of the surface (one face or both faces) of the positive electrode collector 32, the region being adjacent to the positive electrode active material layer 34. In other words, the insulating layer 36 is provided along an edge of the positive electrode active material layer 34 in the width direction. As described later, the insulating layer 36 is provided at least in a region opposing the negative electrode active material layer 44, and being a region (region in which the positive electrode active material layer 34 is not formed), adjacent to the positive electrode active material layer 34. In an example, as illustrated in FIG. 3, the insulating layer 36 may protrude by a dimension α outward the negative electrode active material layer 44 (leftward in the figure), in the width direction. The dimension α is designed to a dimension such that, also in a case where positional deviation occurs in the negative electrode active material layer 44, the edge of the negative electrode active material layer 44 can be sufficiently covered by the insulating layer 36, so as to avoid a situation in which the negative electrode active material layer 44 and the positive electrode collector 32 oppose each other only across the separator 50. Further, a dimension α may be designed to a dimension such that the insulating layer 36 does not protrude beyond the edge of the separator 50 in the width direction, in order to prevent foil puckering defects in the collector 32 (uncoated section 32A). The dimension α may be designed to a dimension that allows sufficiently covering the edge of the negative electrode active material layer 44 also in a case where the insulating layer 36 undergoes thermal shrinkage in a high-temperature environment. The dimension α may be set, although not limited thereto, for instance to 113% or more, and for instance 150% or less, of the dimension by which the negative electrode active material layer 44 protrudes beyond the positive electrode active material layer 34. An uncoated section 32A in which the positive electrode collector 32 is exposed may be provided, for the purpose of power collection, on the insulating layer 36, on the side not adjacent to the positive electrode active material layer 34.

Examples of the inorganic filler 36a that makes up such an insulating layer 36 and can be used include a heat-resistant and electrochemically stable material that is capable of insulating the positive and negative electrodes from each other, without softening or melting at a temperature of 600° C. or higher, typically 700° C. or higher, and for instance 900° C. or higher. The inorganic filler can be made up typically for instance of an inorganic material or glass material, or a composite material thereof, having heat resistance and insulating properties. Concrete examples of such inorganic fillers include specifically inorganic oxides such as alumina ($Al_2O_3$), magnesia (MgO), silica ($SiO_2$), titania ($TiO_2$), and barium titanate ($BaTiO_3$); nitrides such as aluminum nitride and silicon nitride; metal hydroxides such as calcium hydroxide, magnesium hydroxide and aluminum hydroxide; minerals such as mica, talc, boehmite, zeolite, apatite and kaolin; and glass materials. Preferred inorganic fillers among the foregoing include boehmite ($Al_2O_3*H_2O$), alumina ($Al_2O_3$), silica ($SiO_2$) and barium titanate ($BaTiO_3$), in terms of stable quality and also low cost and ready availability. An inorganic filler that is excessively hard may unintentionally wear out the positive electrode collector 32 and/or equipment contact sections during the production process, thereby giving rise to metal foreign matter. From the above viewpoint, boehmite having appropriate hardness is more preferably used as the inorganic filler. In terms of being coated with LPO, however, the inorganic filler disclosed herein may also be alumina ($Al_2O_3$) of stable quality and which is readily procurable. The inorganic filler may contain any one type of the foregoing, singly or combinations of two or more types.

The average particle size of the inorganic filler is not particularly limited. Typically the average particle size is 3 μm or less, preferably 2 μm or less, for instance 1 μm or less, from the viewpoint of suitably forming the insulating layer 36 of the above thickness. However, an excessively fine inorganic filler is poor in handleability and homogeneous dispersibility, and is therefore undesirable. Accordingly, the average particle size of the inorganic filler is typically 0.05 μm or more, preferably 0.1 μm or more, and for instance 0.2 μm or more. The average particle size is a cumulative 50% particle size in a volume-basis particle size distribution obtained by laser diffraction/scattering, similarly for instance to the positive electrode active material.

Further, $D1<D2$ is satisfied, where D1 denotes the average particle size of the inorganic filler and D2 denotes the average particle size of the positive electrode active material. By virtue of the fact that $D1<D2$ holds, it becomes possible to suitably prevent that the surface height position of the insulating layer 36 from the surface of the positive electrode collector 32 should stand higher than the surface height position of the positive electrode active material layer 34 from the surface of the positive electrode collector 32, when the insulating layer 36 is formed so as to overlap the edge of the positive electrode active material layer 34.

A characterizing feature of the insulating layer 36 disclosed herein is that at least part of the surface of the inorganic filler 36a is covered with the LPO 36b. By virtue of the fact that the insulating layer 36 contains the LPO 36b, this LPO 36b leaches from the insulating layer 36 at the time of overcharge, which allows effectively forming, on the surface of the negative electrode 40, a good coating film that suitably contributes to suppressing generation of heat in the negative electrode 40. Studies by the inventors have revealed that by providing the insulating layer 36 at a position opposing the negative electrode active material layer 44, being a positive electrode collecting section that can be readily brought to a high-potential state on account of current collection, i.e. by providing the insulating layer 36 set to be adjacent to the edge of the positive electrode active material layer 34, and by arranging the LPO 36b in the insulating layer 36, a configuration can be achieved in which in particular exothermic reactions in the negative electrode can be effectively suppressed by the coating film derived from the LPO 36b. A configuration where the insulating layer 36 is provided at the edge of a positive electrode coating is well known (see for instance Japanese Patent Application Publication No. 2017-143004), but the particular contributions to suppression of heat generation, elicited by arranging the LPO 36b in the insulating layer 36, and by covering at least part of the surface of the inorganic filler 36a by the LPO 36b, are novel features hitherto unknown. Such a configuration allows effectively inhibiting further exothermic reactions on the surface of the negative electrode, and for instance further improving the overcharge resistance of the battery.

Figure 4B:
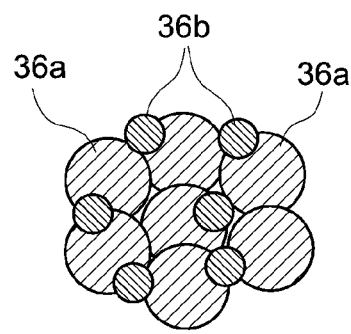

The LPO 36b covers at least part of the surface of the inorganic filler 36a. The LPO 36b is essentially in a stand-alone form (for instance as a powder), not contained in the insulating layer 36. Although the details involved are not clear, it is deemed that in a configuration where, as illustrated in FIG. 4B, the insulating layer 36 is formed through mixing of the LPO 36b, for instance in the form of a powder, with the inorganic filler 36a, the LPO 36b is present in a localized fashion (in other words, scattered) within the insulating layer 36, and for instance an ideal coating film cannot be formed since the LPO 36b does not leach readily from the insulating layer 36, and/or reaches unevenly the surface of the negative electrode active material layer 44. In contrast to this, it is deemed that by virtue of the fact that the LPO 36b is present within the insulating layer 36 while covering the surface of the inorganic filler 36a, the LPO 36b leaches suitably when the positive electrode collector is at high potential, and a coating film that affords a high heat generation suppression effect can be formed, without unevenness, on the surface of the negative electrode active material layer 44. This is deemed to be a manifestation of the effect of promoting leaching of the LPO 36b that is present on the surface of the inorganic filler 36a, which is a mineral, through effective heating of the inorganic filler 36a, when the positive electrode collector is at a high potential. The above coating film forming effect and heat generation suppression effect can be elicited, though depending also on the mixing proportion of the LPO 36b, through arrangement of the LPO 36b so as to cover the surface of the inorganic filler 36a even if by a little. Although not necessarily limited thereto, preferably 30% or more, or 40% or more, or 50% or more, or 60% or more, or 70% or more, for instance 80% or more, or 90% or more, and substantially 100% of the surface of the inorganic filler 36a may be covered with the LPO 36b.

Such an LPO-coated inorganic filler can be prepared for instance through covering of the surface of the inorganic filler 36a by the LPO 36b. The method for covering the inorganic filler 36a with the LPO 36b is not particularly limited, and various known methods can be resorted to herein. Suitable examples of methods include a method in which LPO is caused to precipitate, in the form of a layer, on an inorganic filler, as in the working examples described below, a method for chemical synthesis of composite particles in which an LPO shell is formed on an inorganic filler core, for instance by self-organization, a chemical deposition (chemical vapor deposition: CVD) method for instance relying on atomic layer deposition (ALD), and a physical vapor deposition (PVD) method for instance relying on sputtering. A preferred method in order to uniformly and conveniently coat the surface of the inorganic filler 36a with the LPO 36b, without unevenness, involves impregnating an inorganic filler with a solution containing an LPO component, and thereafter causing LPO to precipitate, in the form of a layer, on the surface of the inorganic filler.

A small amount of LPO 36b covering the inorganic filler 36a is undesirable herein since in that case the leaching promotion effect of the LPO 36b, and in consequence the heat generation suppression effect of the LPO 36b, cannot be sufficiently brought out. The thickness (average thickness; likewise hereafter) of the LPO 36b covering the inorganic filler 36a may be preferably 100 nm or more, more preferably 150 nm or more, for instance 200 nm or more, or 250 nm or more, or 300 nm or more. The leaching promotion effect of the LPO 36b may depend also on the relative size of the inorganic filler 36a. For instance a ratio (t/$D_{50}$) of the thickness t of the LPO-coated layer with respect to the average particle size ($D_{50}$) of the inorganic filler 36a may be appropriately 0.1 or higher, or 0.15 or higher, and may be preferably 0.2 or higher, for instance 0.25 or higher, or 0.3 or higher. When the LPO 36b that covers the inorganic filler 36a attains a given thickness, however, the above effect reaches a plateau, and no further distinctive effect can be expected to be brought out through an increase of the thickness of the LPO 36b beyond that value. A problem may arise in that for instance output resistance becomes prone to increase when the content of the LPO 36b in the insulating layer 36 is excessive. Therefore, the thickness of the LPO 36b can be adjusted as appropriate, as a yardstick, for instance to about 1200 nm or less, and for instance to about 1100 nm or less, or 1000 nm or less, or 800 nm or less. The ratio (t/$D_{50}$) may be preferably about 1.2 or lower, and may be 1.1 or lower, or 1 or lower, preferably 0.9 or lower, and may be for instance 0.8 or lower, or 0.6 or lower, or 0.5 or lower, or 0.4 or lower.

For instance, the fact that the surface of the inorganic filler 36a is covered with LPO 36b, as well as the value of coverage by the LPO 36b, can both be checked suitably for example through observation using an electron microscope. For instance a high-resolution resolution scanning electron microscope, a transmission electron microscope or the like can be used as the electron microscope. The thickness t (thickness of the LPO layer) of the LPO 36b covering the inorganic filler 36a can be grasped through observation of cross sections of the LPO-coated inorganic filler. Depending on the observation instrument, a cross section of the LPO-coated inorganic filler, can be prepared by polishing a cross section cut out of a known resin-embedded sample, or by preparing a thin sample and then cutting a cross section in accordance with a focused ion beam (FIB) method. The coverage of the inorganic filler 36a by the LPO 36b can be grasped through calculation, relying on an image analysis method, of the proportion (%) of the surface area of the LPO 36b with respect to the surface area of the inorganic filler 36a plus the LPO 36b.

The above heat generation suppression effect and overcharge resistance enhancement effect on a battery are elicited by virtue of the fact that the insulating layer 36 contains the LPO 36b, even if in very small amounts. The amount of LPO 36b in the insulating layer 36 should however be large, in order to bring out the above effects in a more pronounced fashion. From the above viewpoint, the proportion of the LPO 36b in the insulating layer 36 may be 0.1 part by mass or more, more preferably 0.3 parts by mass or more, for instance 0.5 parts by mass or more, or 0.88 parts by mass or more, or 0.9 parts by mass or more, and for instance about 1 part by mass, relative to 100 parts by mass of the inorganic filler 36a. The proportion of the LPO may be 10 parts by mass or less, more preferably 8.8 parts by mass or less, for instance 7 parts by mass or less, and yet more preferably for instance 6 parts by mass or less, in terms of manufacture workability with insulation. Further, a proportion P1 of LPO in the insulating layer 36, in an implementation where the positive electrode active material layer 34 contains LPO, is preferably relatively higher than a proportion P2 of the LPO contained in the positive electrode active material layer 34, and the proportion of the content of LPO in the insulating layer 36 is desirably similar to or higher than the proportion of LPO in the positive electrode active material layer 34, from the viewpoint of suitably suppressing generation of heat by the battery. Specifically, a ratio (P1/P2) of the proportion P1 of the LPO contained in the insulating layer 36 with respect to the proportion P2 of LPO contained in the positive electrode active material layer 34 may be preferably 0.3 or higher, more preferably 0.5 or higher, and for instance 1 or higher (or higher than 1), and may be yet more preferably 1.2 or higher, and particularly preferably 1.5 or higher.

The mass (coating amount) of the LPO 36b in the insulating layer 36) can be grasped on the basis of the mass of the LPO 36b that covers the inorganic filler 36a. To work out the mass of the LPO 36b covering the inorganic filler 36a, for instance the mass of the inorganic filler 36a prior to coating with the LPO 36b and the mass of the inorganic filler 36a after coating with the LPO 36b are measured, and the resulting difference can be taken as the mass of the LPO 36b that coats the inorganic filler 36a. Conversely, the mass of the inorganic filler 36a coated with the LPO 36b and the mass of the inorganic filler 36a upon removal of the LPO 36b coating from the inorganic filler 36a can be measured, whereupon the resulting difference can be taken as the mass of the LPO 36b that coats the inorganic filler 36a. In this case, for instance the inorganic filler 36a coated with the LPO 36b may be dipped in an acid such as dilute nitric acid, to thereby allow just the LPO 36b alone to be removed, through dissolution, from the inorganic filler 36a.

For instance, various binders that can be used in positive electrode active material layers may be used herein as the binder contained in the insulating layer 36. Among the foregoing, a vinyl halide resin such as polyvinylidene fluoride (PVdF) or an acrylic resin can be preferably used as the binder, from the viewpoint of suitably forming an insulating layer 36 of appropriate thickness, while imparting thereto flexibility at the time of current collection through bundling of a plurality of positive electrode collectors 32. For instance the proportion of the binder contained in the insulating layer 36 is typically 1 mass % or more, preferably 5 mass % or more, and may be 8 mass % or more, or 10 mass % or more. For instance the binder contained in the insulating layer 36 may be typically, 30 mass % or less, or 25 mass % or less, or 20 mass % or less, or 18 mass % or less, or 15 mass % or less. In a representative example, the binder may be adjusted as appropriate to be 5 to 20 mass %. The basis weight of such an insulating layer 36 may be for instance about 0.5 mg/cm$^2$ or more, 0.7 mg/cm$^2$ or more, or 1 mg/cm$^2$ or more, and may be 1.5 mg/cm$^2$ or less, 1.3 mg/cm$^2$ or less, or 1.2 mg/cm$^2$ or less.

The thickness (average thickness; likewise hereafter) of the insulating layer 36 is not limited in strict terms, but In a case for instance where metal foreign matter intrudes between the positive electrode and the negative electrode, it is preferable that the thickness of the insulating layer 36 should allow sufficiently suppressing short circuits, derived from this metal foreign matter, between the positive electrode collector 32 and the negative electrode active material layer 44, derived from this metal foreign matter. From this viewpoint, the thickness of the insulating layer 36 may be 1 μm or more, preferably 3 μm or more, and more preferably for instance 4 μm or more. However, the volume of the insulating layer 36 is preferably as small as possible, since the insulating layer 36 may give rise to foil puckering and may impair welding workability. From this standpoint, the insulating layer 36 may be 20 μm or less, for instance 18 μm or less, or 15 µm or less, or 10 µm or less (for instance smaller than 10 µm), and may be 8 µm or less, for instance 6 µm or less, or 5 µm or less. For example a ratio (T1/T2) of T1 and T2, where T1 denotes the thickness of the insulating layer 36 and T2 denotes the thickness of the positive electrode active material layer, is 1 or lower, typically ½ or lower, preferably ⅖ or lower, more preferably ⅓ or lower, and yet more preferably ¼ or lower, or ⅕ or lower. The ratio (T1/T2) may be ¹⁄₁₀ or higher, for instance ⅛ or higher, and ⅙ or higher, from the viewpoint of sufficiently bringing out the function of the insulating layer 36. The thickness T1 of the insulating layer 36 is the height of the insulating layer 36 from the surface of the positive electrode collector 32, and does not include the thickness of the portion formed through overlap of the insulating layer 36 on the positive electrode active material layer 34.

The negative electrode 40 is configured by being provided with the negative electrode active material layer 44 on a negative electrode collector 42. An uncoated section 42A in which the negative electrode active material layer 44 is not formed and in which the negative electrode collector 42 is exposed may be provided, for the purpose of power collection, on the negative electrode collector 42. The negative electrode active material layer 44 contains a negative electrode active material. In the negative electrode active material layer 44, particles of a granular negative electrode active material are typically bonded to each other, and to the negative electrode collector 42, by means of a binder. The negative electrode active material stores lithium ions, which are charge carriers, from the electrolyte solution, and releases the lithium ions to the electrolyte solution, accompanying charging and discharge. Various materials used conventionally as negative electrode active materials in lithium ion batteries can be used herein as the negative electrode active material, without particular limitations. Preferred examples include lithium storage compounds such as carbon materials, for instance man-made graphite, natural graphite, amorphous carbon, and composites thereof (for instance amorphous carbon-coated graphite), and materials that form an alloy with lithium, such as silicon (Si), lithium alloys of the foregoing (for instance $Li_XM$, where M is for example C, Si, Sn, Sb, Al, Mg, Ti, Bi, Ge, Pb or P, and X is a natural number), as well as silicon compounds (for instance SiO). Such a negative electrode 40 can be produced for instance by supplying a negative electrode paste resulting from dispersing a powdery negative electrode active material and a binder (for instance a rubber such as a styrene butadiene copolymer (SBR) or an acrylic acid-modified SBR resin (SBR-based latex), or a cellulosic polymer such as carboxymethyl cellulose (CMC)) in an appropriate dispersion medium (for instance water or N-methyl-2-pyrrolidone, preferably water), onto the surface of the negative electrode collector 42, followed by removal of the dispersion medium by drying. A conductive member containing a metal having good conductivity (for instance copper, nickel, titanium, or stainless steel) can be suitably used as the negative electrode collector.

The average particle size ($D_{50}$) of the negative electrode active material particles is not particularly limited, and may be for instance 0.5 µm or more, preferably 1 µm or more, and more preferably 5 µm or more. Further, the average particle size may be 30 µm or less, preferably 20 µm or less, and more preferably 15 µm or less. The proportion of the negative electrode active material in the negative electrode active material layer 44 as a whole is appropriately set to about 50 mass % or more, preferably to 90 mass % to 99 mass %, and for instance to 95 mass % to 99 mass %. In a case where a binder is used, the proportion of the binder in the negative electrode active material layer 44 can be set for instance to about 0.1 parts by mass to 5 parts by mass, and ordinarily is appropriately set to about 0.5 parts by mass to 2 parts by mass, relative to 100 parts by mass of the negative electrode active material. The thickness (average thickness; likewise hereafter) of the negative electrode active material layer 44 is for instance set to be 10 µm or more, typically 20 µm or more, and may be set to be 80 µm or less, typically 50 µm or less. The density of the negative electrode active material layer 44 is not particularly limited, and may be for instance 0.8 g/cm³ or higher, typically 1.0 g/cm³ or higher, and may be set to be 1.5 g/cm³ or lower, typically 1.4 g/cm³ or lower, and for instance 1.3 g/cm³ or lower.

A coating film (not shown) derived from LPO may be provided on the surface of the negative electrode active material layer 44. This coating film may be formed through initial charging, after battery assembly, or may be formed through overcharge. The coating film derived from LPO can be checked through detection of components of phosphate ions ($PO_4^{3-}$) or phosphorus (P) on the surface of the negative electrode active material layer. As an example, the negative electrode active material layer is punched to a predetermined size, and the resulting surface is washed with an acidic solvent (for instance sulfuric acid), to thereby elicit leaching of phosphate ions ($PO_4^{3-}$) and phosphorus (P) components. Phosphorus atoms from the obtained leached solution are determined quantitatively for instance by inductively coupled plasma-optical emission spectrometry (ICP-OES), and phosphate ions can be quantified by ion chromatography, to thereby enable grasping the presence, and formation amount, of the LPO-derived coating film that becomes formed on the surface of the negative electrode active material layer. The qualitative and quantitative analysis methods of the phosphate ions ($PO_4^{3-}$) and phosphorus (P) components can be properly selected, by a person skilled in the art, from among the above examples and known methods in analytical chemistry, taking into consideration for instance the influence of additives and the like of the electrolyte solution.

The separator 50 is a constituent element that insulates the positive electrode 30 and the negative electrode 40 and that provides movement paths for charge carriers between the positive electrode active material layer 34 and the negative electrode active material layer 44. Such a separator 50 is typically disposed between the positive electrode active material layer 34 and the negative electrode active material layer 44. The separator 50 may have a function of holding a nonaqueous electrolyte solution, and a shutdown function of blocking the movement paths of the charge carriers at a predetermined temperature. Such a separator 50 can be suitably configured out of a microporous resin sheet made of a resin such as polyethylene (PE), polypropylene (PP), polyester, cellulose, or polyamide. Among the foregoing, a microporous sheet made of a polyolefin resin such as PE or PP is preferred herein since such a sheet allows suitably setting a shutdown temperature to lie in the range of 80° C. to 140° C. (typically 110° C. to 140° C., for instance 120° C. to 135° C.). The shutdown temperature is the temperature at which electrochemical reactions of the battery are stopped when the battery generates heat, the shutdown being typically manifested in the form of melting or softening of the separator 50 at that temperature. Such a separator 50 may have a single-layer structure made up of a single material, or a structure (for instance a three-layer structure in which a PP layer is laid up on both faces of a PE layer) being a stack of two or more types of microporous resin sheets having different materials and/or properties (for instance average thickness and/or porosity).

The thickness of the separator 50 (average thickness; likewise hereafter) is not particularly limited, but can be ordinarily set to 10 μm or more, typically 15 μm or more, and for instance 17 μm or more. The upper limit of the thickness can be set to be 40 μm or less, typically 30 μm or less, and for example 25 μm or less. The permeability of charge carriers can be maintained satisfactorily, and small short circuits (leak currents) become unlikelier to occur, by virtue of the fact that the average thickness of the base material lies within the above ranges. As a result, it becomes possible to achieve input-output density and safety at a high level.

Examples of the nonaqueous electrolyte solution which can be typically used include, without particular limitations, a solution resulting from dissolving or dispersing a supporting salt (for instance a lithium salt, a sodium salt or a magnesium salt, or a lithium salt in a lithium ion battery) as an electrolyte, in a nonaqueous solvent. Alternatively, the nonaqueous electrolyte solution may be for instance a so-called polymer electrolyte or solid electrolyte made into a gel through addition of a polymer to a liquid nonaqueous electrolyte. Examples of the nonaqueous solvent which can be used include, without particular limitations, various types of organic solvent, for instance carbonates, ethers, esters, nitriles, sulfones, lactones and the like that are utilized as electrolyte solutions in general lithium ion batteries. Specific examples thereof include linear carbonates such as diethyl carbonate (DEC), dimethyl carbonate (DMC) and ethyl methyl carbonate (EMC), as well as cyclic carbonates such as ethylene carbonate (EC) and propylene carbonate (PC). Among the foregoing, preferably the nonaqueous solvent partially contains for instance a solvent (for example a cyclic carbonate) that generates hydrogen ions by decomposing in an acidic atmosphere of the positive electrode. Such a nonaqueous solvent may be fluorinated. The nonaqueous solvent may be used singly, or in combinations of two or more types. Various salts that are used in general lithium ion batteries can be selected and used herein as the supporting salt. Examples thereof include lithium salts such as $LiPF_6$, $LiBF_4$, $LiClO_4$, $LiAsF_6$, $Li(CF_3SO_2)_2N$ and $LiCF_3SO_3$. In the art disclosed herein an effect is elicited of suppressing generation of heat at the time of overcharge, and accordingly it is preferable to use, as the supporting salt, for instance a lithium compound that contains fluorine and which generates hydrogen fluoride (HF) by decomposing at the time of overcharge, since in that case the effect of the present invention is elicited more pronouncedly. Such a supporting salt may be used singly, or in combinations of two or more types. The supporting salt is preferably adjusted so that the concentration thereof in the nonaqueous electrolyte nonaqueous electrolyte lies in the range of 0.7 mol/L to 1.3 mol/L.

The nonaqueous electrolyte may contain various additives, so long as the characteristics of the lithium ion battery disclosed herein are not impaired thereby. The additives, which may be for instance a gas generating agent, a film forming agent and so forth, can be used for one, two or more purposes from among for instance improving the input-output characteristics, improving the cycle characteristics, and improving initial charge and discharge efficiency, of the battery. Concrete examples of such additives include fluorophosphates (preferably difluorophosphate salts, for example lithium difluorophosphate represented by $LiPO_2F_2$), as well as oxalate complex compounds such as lithium bis(oxalato)borate (LiBOB). The concentration of the additives with respect to the nonaqueous electrolyte as a whole is appropriately set ordinarily to 0.1 mol/L or less (typically 0.005 mol/L to 0.1 mol/L).

The lithium ion battery 1 illustrated in FIG. 1 utilizes a flat rectangular battery case as the battery case 10. However, the battery case 10 may be a non-flat rectangular battery case, a cylindrical battery case, a coin-type battery case or the like. Alternatively, the lithium ion battery 1 may be a laminate bag formed through bonding of a metal-made battery case sheet (typically an aluminum sheet) and a resin sheet, to yield a bag shape. For instance, the battery case may be formed out of aluminum or iron, or a metal alloy of the foregoing, or out of high-strength plastic. The lithium ion battery 1 illustrated in FIG. 1 has for instance a so-called wound electrode body 20 of a form resulting from laying of an elongate positive electrode 30 and an elongate negative electrode 40, insulated from each other by two separators 50, the resulting stack being then wound, to yield an oval cross section, around a winding axis WL. As illustrated in FIG. 2 and FIG. 3, a width W1 of the positive electrode active material layer 34, a width W2 of the negative electrode active material layer 44, and a width W3 of the separators satisfy the relationship W1<W2<W3. The negative electrode active material layer 44 covers the positive electrode active material layer 34, at both edges in the width direction, and the separator 50 covers the negative electrode active material layer 44 at both edges in the width direction. Each insulating layer 36 covers at least the positive electrode collector 32, in a region opposing the edge of the negative electrode active material layer 44, while being adjacent to a respective positive electrode active material layer 34. However, the electrode body 20 of the lithium ion battery 1 disclosed herein is not limited to being a wound electrode body, and may be an electrode body 20 in the form of so-called flat laminated type in which for instance a plurality of positive electrodes 30 and negative electrodes 40 are laid up while insulated from each other by respective separators 50. Alternatively, single cells each having one positive electrode 30 and one negative electrode 40 may be accommodated individually in a battery case.

The battery case 10 is typically made up of a case body 11 having an opening on one face, and a lid member 12 that covers the opening. Similarly to battery cases of conventional lithium ion batteries, the lid member 12 may be provided with for instance a safety valve for venting, to the exterior, gas generated within the battery case, and with a filling port for injecting the electrolyte solution. A positive electrode terminal 38 and a negative electrode terminal 48 for external connection can be typically disposed, on the lid member 12, while insulated from the battery case 10. The positive electrode terminal 38 and the negative electrode terminal 48 are electrically connected to the positive electrode 30 and the negative electrode 40 via a positive electrode collector terminal 38a and a negative electrode collector terminal 48a, respectively, and are configured to be capable of supplying power to an external load.

The lithium ion battery disclosed herein can be used in various applications, but can be for instance a battery that affords also high safety upon repeated charging and discharge at a high rate, as compared with conventional batteries. Moreover, such superior battery performance and reliability (including safety such as thermal stability at the time of overcharge) can be brought out at a high level. Therefore, the lithium ion battery disclosed herein can be preferably used, by exploiting such characterizing features, in applications that demand high energy density and high input-output density, and applications that require high reliability. Examples of such applications include drive power sources installed in vehicles such as plug-in hybrid vehicles, hybrid vehicles, and electric vehicles. The lithium ion battery 1 can be used in the form of an assembled battery typically resulting from connecting a plurality of the batteries in series and/or in parallel.

The lithium ion battery disclosed herein was produced in concrete working examples below. The art disclosed herein however is not intended to be limited to instances illustrated in these concrete examples.

Preparation of LPO-Coated Inorganic Filler

An inorganic filler coated with LPO was prepared. Specifically, firstly a granular boehmite powder having an average particle size of about 0.8 to 1.1 μm was prepared as the inorganic filler, and the average particle size $D_{50}$ was measured using a particle size distribution meter of laser diffraction type. Next, the boehmite powder was dispersed in a phosphoric acid solution, and a lithium hydroxide solution was added thereto, to cause trilithium phosphate (LPO) to precipitate as a result on the surface of boehmite particles. The average particle size of the boehmite powder, and for instance the concentration and pH of the phosphoric acid solution were adjusted, to thereby modify, in eight ways, the amount of and precipitation form of the LPO with which the boehmite powder was coated. Respective boehmite powders (LPO-coated boehmite) of Examples 1 to 8 having the surface thereof coated with LPO were prepared as a result. The LPO coating amount with which the boehmite powder was covered was calculated on the basis of the mass of the boehmite powder before and after coating with LPO. Table 1 sets out the proportions of LPO in the LPO-coated boehmite of each example relative to 100 parts by mass of the boehmite powder, obtained from the above results.

The prepared LPO-coated boehmite of each example was embedded in a resin, and the surface of the resin was polished, to obtain a cross section of the LPO-coated boehmite and prepare thereby an observation sample for electron microscopy. Each sample was observed using a high-resolution scanning electron microscope, to measure the thickness t of the LPO-coated layer in the cross section of the LPO-coated boehmite. The thickness of the LPO-coated layer was measured at 3 or more points, for each particle, and an arithmetic mean value of thickness measured for 10 or more particles was taken as the thickness t of the LPO-coated layer. The ratio ($t/D_{50}$) of the thickness of the LPO-coated layer with respect to the average particle size of the boehmite was calculated on the basis of the obtained average particle size $D_{50}$ of the boehmite and the thickness t of the LPO-coated layer. The results are given in Table 1.

Construction of Secondary Batteries for Evaluation

Firstly, a complex oxide ($LiNi_{1/3}Co_{1/3}Mn_{1/3}O_2$: NCM) of layered structure and containing lithium, nickel, cobalt, and manganese, as a positive electrode active material, trilithium phosphate ($Li_3PO_4$: LPO), acetylene black (AB) as a conductive aid, polyvinylidene fluoride (PVdF) as a binder, and N-methyl-2-pyrrolidone (NMP) as a solvent, were mixed, to thereby prepare a positive electrode paste. The mass ratio was set to a given ratio of NCM:AB:PVdF=90:8:2, and the proportion of LPO with respect to (100 parts by mass of) NCM was set to 0.88 parts by mass. Herein NCM having an average particle size of 4 μm was used as the NCM, and LPO having an average particle size of 2.5 μm was used as LPO.

Each LPO-coated boehmite of Examples 1 to 8 prepared above, as an inorganic filler (F), and PVdF (B) as a binder, were mixed at a mass ratio of F:B=82:18, and the resulting mixture was dispersed in N-methyl-2-pyrrolidone (NMP) as a dispersion medium, with kneading, to thereby prepare inorganic filler pastes of Examples 1 to 8. An inorganic filler paste of Example 9 was prepared in the same way, but using a boehmite powder prior to coating with LPO, instead of an LPO-coated boehmite, as the inorganic filler (F). While using a boehmite powder prior to coating with LPO, as an inorganic filler (F), herein LPO having an average particle size of 2.5 μm and PVdF (B) as a binder were dispersed in N-methyl-2-pyrrolidone (NMP) as a dispersion medium, with kneading, to thereby prepare inorganic filler pastes of Examples 10 and 11. The above were mixed at a mass ratio of F:B=82:18, with LPO being added in an amount of 0.88 parts by mass (Example 10) and 1.0 part by mass (Example 11) relative to 100 parts by mass of the boehmite powder.

The prepared positive electrode paste and the inorganic filler paste of each example were applied simultaneously on an elongate aluminum foil 12 μm thick, using a die coater, with drying, to thereby form a positive electrode active material layer and an insulating layer. The positive electrode paste was supplied to a region twice as wide as the positive electrode active material layer, in the center of a discharge slit of the die coater, in the width direction, and the inorganic filler paste was supplied to a region adjacent to the positive electrode active material layer, from both sides of the positive electrode paste, in the width direction, to thereby firstly produce a positive electrode of double width. Next, the positive electrode active material layer was cut along the center in the width direction, to yield two positive electrodes of predetermined width. The positive electrodes of Examples 1 to 11 were obtained as a result. The average thickness of the positive electrode active material layer was set to about 20 μm, and the average thickness of the insulating layer was set to 6 μm. In each positive electrode produced in the present test examples, an uncoated section, an insulating layer, and a positive electrode active material layer were sequentially provided along the width direction of the positive electrode collector, with the proportion of the width of the insulating layer with respect to the width of the positive electrode active material layer set to about 5%, and the proportion of the width of the insulating layer with respect to the width of the uncoated section set to about 50%.

Further, graphite (C) as a negative electrode active material, styrene butadiene rubber (SBR) as a binder, and carboxymethyl cellulose (CMC) as a thickener were kneaded, at a mass ratio of C:SBR:CMC=98:1:1, with ion-exchanged water, to thereby prepare a negative electrode paste. The prepared negative electrode paste was applied on both faces of an elongate copper foil 10 μm thick, as a negative electrode collector, with drying, to yield a negative electrode provided with a negative electrode active material layer. An uncoated section, for the purpose of power collection, in which the negative electrode active material layer was not formed, was provided along one of the edges of the negative electrode, in the width direction.

Each positive electrode prepared in Examples 1 to 11 above and the negative electrode were superimposed across two separators in between, and the resulting stack was then wound, to thereby construct a wound electrode body. The positive electrode and the negative electrode were superimposed on each other in such a manner that the uncoated section of the positive electrode and the uncoated section of the negative electrode were positioned on opposite sides in the width direction, and so that the negative electrode active material layer jutted from both edges of the positive electrode active material layer in the width direction, and the insulating layer jutted from an opposing end of the negative electrode active material layer in the width direction. Porous sheets having a three-layer structure of PP/PE/PP were used as the separators. The positive electrode uncoated section and the negative electrode uncoated section in each prepared wound electrode body were respectively connected to a positive electrode terminal and a negative electrode terminal of the battery case, and were accommodated in the case body together with a nonaqueous electrolyte solution, followed by sealing, to thereby obtain lithium ion batteries for evaluation of Examples 1 to 11. A solution resulting from dissolving $LiPF_6$ as a supporting salt, to a concentration of 1 mol/L, in a mixed solvent containing ethylene carbonate (EC), ethyl methyl carbonate (EMC) and dimethyl carbonate (DMC) at a volume ratio of EC:EMC:DMC=3:3:4, was used as the nonaqueous electrolyte solution.

Measurement of Rate of Rise in Temperature Derived from Overcharge

The battery temperature of the prepared lithium ion batteries for evaluation, when brought to an overcharge state under the conditions below, was measured, to calculate a temperature rise rate. The lithium ion battery of each example was charged at constant current at a rate of ⅓ C, in a temperature environment at 25° C., until the battery voltage reached 4.2 V (upper limit potential); thereafter, the battery was discharged at constant current at a rate of ⅓ C until the battery voltage reached 3.0 V (lower limit potential), to thereby perform an initial charging treatment. Next, a thermocouple was attached to the outer surface of the battery case of each lithium ion battery. The highest temperature reached in each battery at the time of constant current charging at a rate of 10 C until the battery voltage reached 5.1 V (overcharge state), in a temperature environment at 25° C., was recorded, and a temperature rise increment (° C.) from 25° C. was calculated. The temperature rise rate at the time of overcharge was calculated on the basis of the following expression: temperature rise rate (%)=(highest temperature reached−25)/25×100. Table 1 sets out normalized values with respect to a reference temperature rise rate of "100" of Example 10.

Measurement of Output Resistance

The resistance values of the prepared lithium ion batteries for evaluation were measured under the conditions below, and a resistance increase rate was calculated. The lithium ion battery of each example was charged at constant current at a rate of ⅓ C, in a temperature environment at 25° C., until the battery voltage reached 4.2 V (upper limit potential); thereafter, the battery was discharged at constant current, at a rate of ⅓ C, until the battery voltage reached 3.0 V (lower limit potential), to thereby perform an initial charging treatment. An initial output resistance (IV resistance) was worked out on the basis of the slope of a discharge curve at the time of discharge, at a rate of 10 C, of each lithium ion battery for evaluation having been adjusted to a state of charge (SOC) of 56% in a temperature environment at 25° C. The results are given in Table 1 normalized with respect to "100" as the output resistance of Example 10.

TABLE 1

| Example | Insulating layer LPO (parts by mass) | LPO thickness (μm) | $t/D_{50}$ | LPO in positive electrode (parts by mass) | Temperature rise rate (%) | Output resistance increase rate (%) |
|---|---|---|---|---|---|---|
| 1 | 8.8 | 1.3 | 1.44 | 0.88 | 74 | 120 |
| 2 | 5.5 | 1.01 | 1.12 | 0.88 | 74 | 97 |
| 3 | 2.0 | 0.54 | 0.60 | 0.88 | 75 | 96 |
| 4 | 1.0 | 0.33 | 0.37 | 0.88 | 77 | 93 |
| 5 | 0.88 | 0.3 | 0.33 | 0.88 | 87 | 93 |
| 6 | 0.50 | 0.19 | 0.21 | 0.88 | 92 | 94 |
| 7 | 0.30 | 0.12 | 0.14 | 0.88 | 93 | 88 |
| 8 | 0.10 | 0.04 | 0.05 | 0.88 | 168 | 86 |
| 9 | 0 | — | — | 0.88 | 183 | 85 |
| 10 | 0.88 (powder mixture) | — | — | 0.88 | 100 | 100 |
| 11 | 1.0 (powder mixture) | — | — | 0.88 | 96 | 94 |

Evaluation

Example 9 is an example in which LPO is added to the positive electrode active material layer, but not to the insulating layer. The battery of Example 9 exhibited the lowest output resistance increase rate of all the examples. The above revealed that the output resistance increase rate is augmented through addition of LPO to the insulating layer.

Further, Examples 10 and 11 are examples in which the LPO powder is added, besides the positive electrode active material layer, also to the insulating layer, in a proportion of 0.88 parts by mass and 1.0 part by mass, respectively, relative to the inorganic filler. A comparison between Examples 9 and 10 revealed that the rise in temperature of the battery (heat generation) at a time where the battery became overcharged, for instance through high-rate charging, could be significantly suppressed (for example down to about 55% and 52%, respectively), by mixing the LPO powder into the insulating layer. It was found that output resistance at the time of high-rate discharge was higher when the LPO powder was mixed into the insulating layer (Examples 10 and 11), namely output resistance was about 1.18 times (Example 10) and 1.11 times (Example 11) with respect to that when the LPO powder was not mixed into the insulating layer (Example 9), and the increase in resistance derived from mixing in of the LPO powder could be kept low in all instances.

By contrast, Example 4 and Example 11 are examples in which the insulating layer contains LPO at a same proportion (1.0 part by mass), with the formulation of the LPO being modified to addition of LPO in the form of a coating material of the surface of the inorganic filler, in Example 4, and to mixing of the LPO in the form of a powder with the inorganic filler, in Example 11. It was found that the values of output resistance increase rate were substantially identical in Example 4 and Example 11, but the temperature rise rate at the time of overcharge was 96% in Example 11, whereas in Example 4 the temperature rise rate was reduced to a yet lower value, of 77%. From the above it was found that LPO may be added in the form of a coating layer on the inorganic filler instead of being added in a powdery state into the insulating layer, in order to efficiently bring out the effect, elicited by LPO, of increasing safety at the time of overcharge. In other words, it was found that by formulating LPO into the insulating layer, in the form of a coating layer of the inorganic filler, it becomes possible to achieve predetermined safety (predetermined low temperature rise rate at the time of overcharge) while curtailing the resistance increase rate, using a smaller amount of LPO.

Examples 1 to 8 are examples in which LPO is formulated, into the insulating layer, in the form of a coating layer of the inorganic filler, and in which the ratio ($t/D_{50}$) of the thickness of the LPO-coated layer with respect to the average particle size of the inorganic filler is set to be dissimilar in respective examples. The ratio ($t/D_{50}$) roughly correlates well with the output resistance increase rate. A trend is observed whereby the higher the ratio ($t/D_{50}$), the higher the output resistance increase rate is, and the lower the ratio ($t/D_{50}$), the lower the output resistance increase rate is. The temperature rise rate at the time of overcharge takes on as a conspicuously high value as 183% in the battery in Example 9, whereas the temperature rise rate at the time of overcharge was reduced to 74% to 168% in the batteries of Examples 1 to 8. Therefore, it is found that addition of LPO to the insulating layer is effective in order to increase the safety of the battery at the time of overcharge.

In the batteries of Examples 1 to 8, the greater the increase in the ratio ($t/D_{50}$), the greater is the decrease in the temperature rise rate at the time of overcharge, it is deemed that the ratio ($t/D_{50}$) should be higher, in terms of safety at the time of overcharge. The results of Example 7 and Example 8 reveal that although the effect of reducing the temperature rise rate is slight when the ratio ($t/D_{50}$) is 0.05, the temperature rise rate decreases however significantly when the ratio ($t/D_{50}$) exceeds 0.05. Therefore, it is found that the thickness of the LPO-coated layer may be set for instance to about 0.08 or higher, or 0.1 or higher, with respect to the average particle size of the inorganic filler, in order to stably improve safety at the time of overcharge.

On the other hand it is found that when the ratio ($t/D_{50}$) is 0.6 or higher, the effect of reducing the temperature rise rate substantially levels off. As described above, the higher the ratio ($t/D_{50}$), the higher the output resistance increase rate is; in particular, the output resistance increase rate augments increases at a stroke between the battery of Example 2 and the battery of Example 1. From all the above it is found that the thickness of the LPO-coated layer may be adjusted so that the ratio ($t/D_{50}$) is lower than 1.44, for instance about 1.3 or less, or 1.2 or less, with respect to the average particle size of the inorganic filler.

Concrete examples of the art disclosed herein have been explained in detail above, but these examples are merely illustrative, and are not intended to limit the scope of the claims. The art set forth in the claims encompasses various alterations and modifications of the concrete examples illustrated above.

While the present invention has been described in detail, the above embodiments and examples are only illustrative, and the invention disclosed herein encompasses various modifications and changes to the specific examples described above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A lithium ion battery, comprising:
   a positive electrode; a negative electrode; and a nonaqueous electrolyte, wherein
   the positive electrode includes
   a positive electrode collector;
   a positive electrode active material layer provided directly on part of the surface of the positive electrode collector; and
   an insulating layer provided directly on another part of the surface of the positive electrode collector, so as to be adjacent to the positive electrode active material layer;
   the insulating layer contains an inorganic filler, trilithium phosphate, and a binder; and
   at least part of the surface of the inorganic filler is covered with the trilithium phosphate.

2. The lithium ion battery of claim 1, wherein a ratio of the thickness of the trilithium phosphate that covers the inorganic filler with respect to the average particle size of the inorganic filler lies in the range of 0.1 to 1.2.

3. The lithium ion battery of claim 1, wherein the average thickness of the insulating layer is 10 μm or less.

4. The lithium ion battery of claim 1, wherein the inorganic filler is at least one selected from the group consisting of a boehmite powder, a zeolite powder, and an alumina powder.

* * * * *